US006222961B1

(12) United States Patent
Engelhardt et al.

(10) Patent No.: US 6,222,961 B1
(45) Date of Patent: Apr. 24, 2001

(54) POINT LIGHT SOURCE FOR A LASER SCANNING MICROSCOPE AND PROCESS FOR FEEDING AT LEAST TWO DIFFERENT LASER BEAMS OF DIFFERENT WAVELENGTHS INTO A LASER SCANNING MICROSCOPE

(75) Inventors: Johann Engelhardt, Schoenborn; Heinrich Ulrich, Heidelberg, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/147,131

(22) PCT Filed: Apr. 16, 1997

(86) PCT No.: PCT/DE97/00762

§ 371 Date: Oct. 15, 1998

§ 102(e) Date: Oct. 15, 1998

(87) PCT Pub. No.: WO97/39375

PCT Pub. Date: Oct. 23, 1997

(30) Foreign Application Priority Data

Apr. 16, 1996 (DE) .............................. 196 14 929
Aug. 17, 1996 (DE) .............................. 196 33 185

(51) Int. Cl.[7] .......................... G02B 21/00; G02B 27/10
(52) U.S. Cl. .................. 385/31; 606/3; 606/15; 359/368
(58) Field of Search .............................. 385/31, 32, 33, 385/39; 359/368; 606/3, 15, 16

(56) References Cited

U.S. PATENT DOCUMENTS

| 5,081,349 | 1/1992 | Iwasaki ................................. 250/234 |
| 5,106,192 | 4/1992 | Tucker et al. ........................ 356/349 |
| 5,147,349 | * 9/1992 | Johnson et al. ........................... 606/4 |
| 5,410,371 | 4/1995 | Lambert ................................ 348/769 |

FOREIGN PATENT DOCUMENTS

| 43 24 681 A 1 | 3/1995 | (DE) . |
| 44 46 185 A 1 | 2/1996 | (DE) . |
| 03 63221 | 4/1990 | (EP) . |
| 0 666 487 A2 | 8/1995 | (EP) . |

OTHER PUBLICATIONS

Paolo Montangero, et. al; A SOM Approach to the Failure Physics of Optoelectronic Devices; Publication Date: Mar. 23, 1993; pp. 380–385.

* cited by examiner

*Primary Examiner*—Frank G. Font
*Assistant Examiner*—Layla G. Lauchman
(74) *Attorney, Agent, or Firm*—Foley & Lardner

(57) ABSTRACT

A point light source is disclosed for a laser scanning microscope (7). At least two lasers (1 and/or 2 and/or 3; 4) with different wavelengths may be coupled in the microscope (7). To combine the advantages of a multiline laser with those of the use of several independent one-line lasers, the point light source is characterised by at least two laser light sources the beam of which are fed into a beam combiner (5), and by an optical fibre (6) which leads directly or indirectly from the beam combiner (5) to the microscope (7).

21 Claims, 1 Drawing Sheet

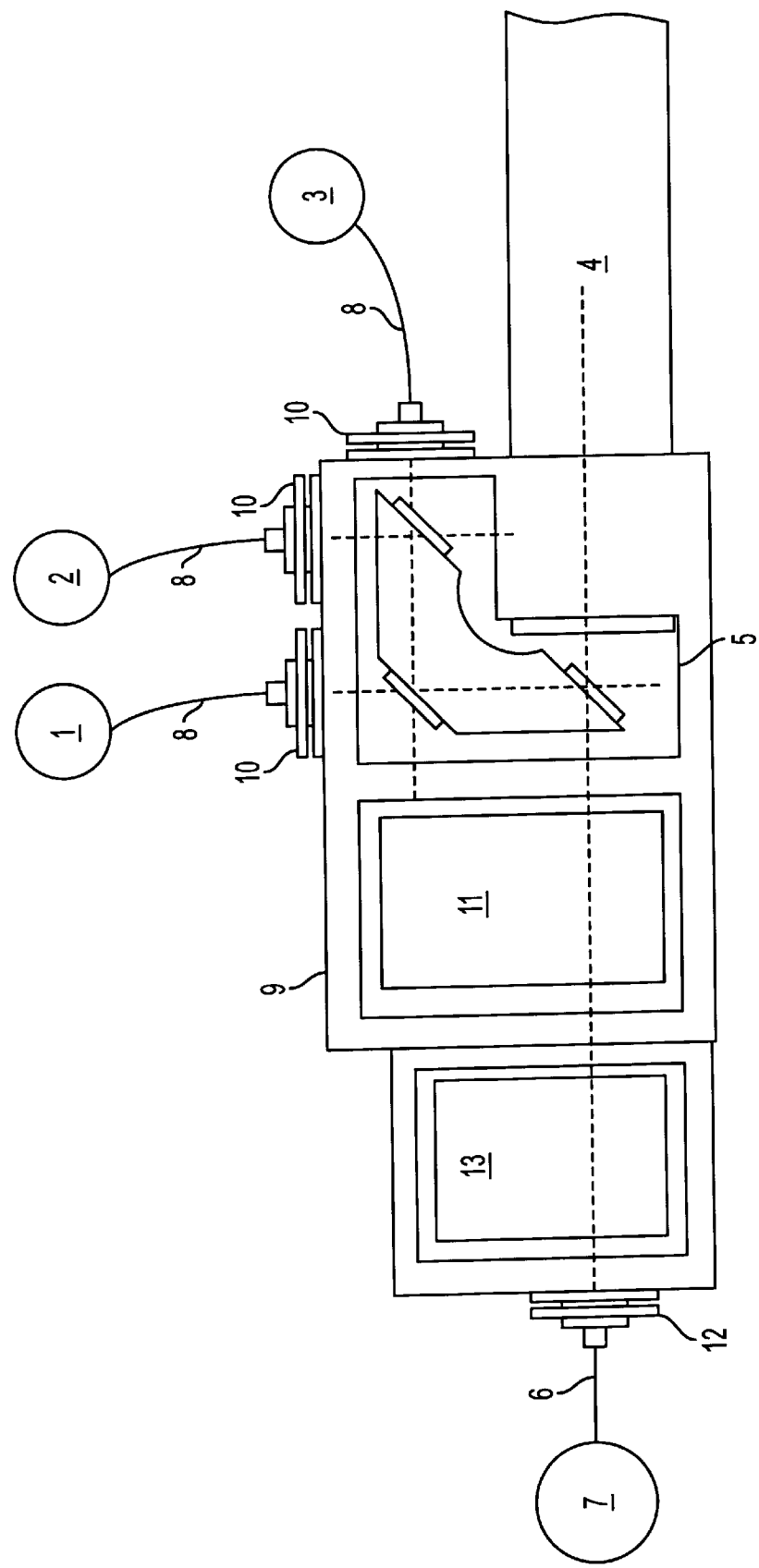

POINT LIGHT SOURCE FOR A LASER SCANNING MICROSCOPE AND PROCESS FOR FEEDING AT LEAST TWO DIFFERENT LASER BEAMS OF DIFFERENT WAVELENGTHS INTO A LASER SCANNING MICROSCOPE

CROSS-REFERENCE TO RELATED APPLICATIONS

This application claims priority of German patent applications DE-A-196 14 929.0 and DE-A-196 33 185.4.

1. Field of the Invention

Point light source for a laser scanning microscope and process for coupling at least two lasers of different wavelength into a laser scanning microscope The invention relates to a point light source for a laser scanning microscope, it being possible to couple at least two lasers of different wavelengths into the microscope. The invention further relates to a process for coupling at least two lasers of different wavelength into a laser scanning microscope.

2. Background of the Invention

Light sources of the type under discussion here are required in laser scanning microscopes, in particular in the case of confocal microscopy. In this case, what principally matters is, within the context of a multicolor application, to couple laser light of different wavelength into the microscope. This has to take place with quite particular consideration being given to the adjustability of the laser and with consideration being given to the stability of the adjustment.

From practice, two different arrangements are known for multicolor application in laser scanning microscopes. Within the context of a first alternative, a laser (ArKr) having a plurality of simultaneous wavelengths is used. In this case, it is inherent in the system that in that instance all laser lines—per se—are adjusted to one another. In this case, the selection of the wavelengths as well as the setting of the power is accomplished by an AOTF (Acousto Optical Tunable Filter). Consequently, each laser line may be set, independently of the others, in its power continuously even down to very low powers. The coupling in takes place in each instance through a single mode fiber. The advantage of the above possibility of coupling in resides in a compact scanner, in absolute adjustability as well as in decoupling of the vibration caused by the laser cooling.

SUMMARY OF THE INVENTION

The advantages described hereinabove do however also involve quite considerable disadvantages. An ArKr laser covers—as has already been mentioned above—a plurality of laser lines simultaneously. As these are generated in a resonator, this always brings about an instability of the individual lines, particularly as, in the laser, only the total power is kept constant by a regulating system. Depending upon the setting of the total power, the noise occurring in this case may amount to up to 10 percent "peak to peak" and thus reduces the image quality with respect to the signal/noise ratio. In contrast to this, single-line lasers achieve noise of only just 1 percent.

Furthermore, in the event of failure of the—singular—laser the system is entirely incapable of functioning. The available laser lines are in all cases dependent upon the laser-active gas and the mixing thereof. As this alters over the service life of the laser, an impairment of all laser lines takes place in the course of time. Finally, only the laser lines of the gas mixture employed are available, so that in this case there is always a restriction-on selection.

In the case of a system which is further known from practice, in all instances a plurality of lasers are coupled directly into a laser scanning microscope. In the event of a laser fault, only one laser line fails. In correspondence with the function of these lasers, the other laser lines remain available. By reason of the single line operation, the laser power exhibits high stability. Single-line lasers have a longer service life than lasers having a plurality of wavelengths. For each laser line, the laser power may be optimally coordinated with the experimental conditions without further auxiliary measures.

It is also the case that the abovementioned coupling of a plurality of lasers into a laser scanning microscope exhibits considerable disadvantages, since, specifically, the laser beams from the different lasers have to be focused or adjusted onto one and the same point in precisely the same direction. In this case, there are four degrees of freedom per laser. If the focusing or adjustment does not take place to a sufficient extent, the images recorded using the different laser lines are not in register. However, the analysis of images which are in register is precisely the purpose of a multiple excitation of the type under discussion here.

A further disadvantage of the use of a plurality of different lasers is to be seen in that conventional beam combining arrangements and adjustment systems have to be readjusted frequently. This procedure is extremely complicated, since in the conventional arrangements the various degrees of freedom of the adjustments are not sufficiently decoupled from one another.

Thus, an alteration of angle always also leads to an alteration of position. Consequently, the adjustment target is attained only after many adjustment cycles, so that the adjustment can scarcely be carried out by the user himself. A particular service provided by the manufacturer of the equipment is accordingly absolutely necessary. Finally, a plurality of lasers together are always more costly than a single laser having a plurality of wavelengths.

Now, the object of the invention is to specify a point light source for a laser scanning microscope, which light source makes use of the advantages of the two abovementioned systems—multiline laser and a plurality of single-line lasers—and at least to a very great extent eliminates the disadvantages thereof. Furthermore, the intention is to specify a process for using such a point light source.

The point light source according to the invention achieves the above object by, a point light source for a laser scanning microscope which comprises at least two laser light sources which couple into a beam combiner and an optical fiber leading indirectly or directly from the beam combiner to the microscope.

According to the invention, it has been recognized in this case that the use of at least two independent laser light sources and thus of at least two different lasers involves the advantages which have been discussed hereinabove. The associated disadvantages may—likewise according to the invention—be eliminated in that, even before coupling into the laser scanning microscope, a beam combination takes place, so that from there onward mutually adjusted laser beams or laser lines having a plurality of wavelengths—in the sense of a multiline laser—are available, which is so in the case of a laser having a plurality of simultaneously occurring wavelengths.

After the beam combination, the combined laser lines are guided simultaneously via an optical fiber to the microscope and are coupled in there—as in the case of a laser having a plurality of simultaneously occurring wavelengths. Consequently, from the beam combination into the fiber onward, all laser lines are automatically adjusted to one another. Accordingly, an adjustment or setting takes place exclusively in the beam combiner, which may be realized in the form of a compact component. A particular adjustment to the coupling in of the laser scanning microscope is not necessary in any circumstances.

In a particularly advantageous manner and to minimize the expenditure on design or apparatus, in particular also for the optimal use of the available space, one of the lasers couples directly into the beam combiner. In other words, this laser is directly allocated to the beam combiner. At least one further laser is coupled into the beam combiner via an optical fiber; in this case, a single mode fiber may be involved. Besides the laser coupling directly into the beam combiner, specifically and in a quite particularly advantageous manner two or three further lasers may in each instance couple into the beam combiner via a separate optical fiber. In this case, laser lines having different wavelengths may be coupled in, so that the result is a multicolor application.

The beam combiner may comprise a conventional component known from the prior art or an appropriate arrangement. Thus, the beam combiner could be designed as a dichroic beam combiner with splitter mirrors of differing transmission/reflection characteristics. Any selectable arrangement for beam combination is useable in each instance; in this case, a monolithic arrangement is to be preferred for reasons of stability, precision, simpler production, but also for reasons of a smaller space requirement. Exchangeability of the beam combiner for geometrically similar but physically differently "trimmed" devices for beam combination is feasible.

In a quite particularly advantageous manner, the beam combiner is disposed in a housing. The laser coupling directly into the beam combiner is possibly fixed to the housing via a particular adapter head or couples directly into the beam combiner at the housing via the adapter head. The further lasers couple in each instance via an optical fiber into the housing, and thus into the beam combiner disposed in the latter and the beam path thereof.

The housing is preferably made of metal. Production from plastic material is of advantage particularly in circumstances in which the housing may be manufactured by injection molding.

For the selection and individual setting of the line power, in a further advantageous manner an AOTF (Acousto Optical Tunable Filter) is connected downstream of the beam combiner. To obtain a compact module, this AOTF is likewise disposed within the housing. With the aid of the AOTF, it is also possible inter alia to compensate any possible coupling-in losses.

There may further be connected downstream of the beam combiner an AOM (Acousto Optical Modulator), which serves for beam modulation and rapid beam deenergization. In this case also, the arrangement within the housing is advisable, particularly since this makes it possible to realize a compact module as a whole.

Finally, with respect to the point light source of the present invention, it is of quite particular advantage if the optical fiber leading from the beam combiner to the microscope, i.e. the fiber coupler, is designed as a single mode fiber. As a result of this, it is achieved that smaller disadjustments become effective, merely as a result of low losses on coupling into the fiber. As has already been mentioned previously, these low losses on coupling-in and thus associated changes in the line power conditions may be compensated by the use of an AOTF.

The inventive process for coupling at least two lasers of different wavelength into a laser scanning microscope achieves the initially mentioned object by a process defined in that the lasers are coupled in jointly as a singular point light source with simultaneous wavelengths or laser lines that are coupled jointly as a singular point light source, into the microscope.

In this case, it is of quite particular advantage if a beam combination takes place already prior to coupling into the microscope—in an independent component. From there, coupling into the microscope then takes place via an optical fiber which is preferably designed as a single mode fiber.

Within the context of the process described here, one of the lasers could be coupled directly and at least one further laser could be coupled via an optical fiber into the encased component—beam combiner. Prior to coupling into the microscope, a selection and individual setting of the line power could take place by means of an AOTF (Acousto Optical Tunable Filter).

Likewise, prior to coupling into the microscope, a beam modulation and possibly rapid beam deenergization could be possible by means of an AOM (Acousto Optical Modulator). Both options may be provided for the sake of a compact design of the point light source or of the point light module within the housing.

There are now various possibilities for refining and further developing the teaching of the present invention in an advantageous manner. In this connection, reference is to be made to the explanation, which follows, of an illustrative embodiment of the invention with reference to the drawing.

BRIEF DESCRIPTION OF THE DRAWING

In conjunction with the explanation of the preferred illustrative embodiment of the invention, refinements and further developments of the teaching which are in general preferred are also explained. In the drawing:

The single FIGURE shows a diagrammatic representation of a point light source according to the invention having a total of four lasers.

DETAILED DESCRIPTION OF THE ILLUSTRATIVE EMBODIMENTS

The module represented in the single FIG. may be defined in total as a point light source for a laser scanning microscope or for a confocal microscope; in this case, in total four lasers 1, 2, 3, 4 are provided here. The lasers 1, 2, 3, 4 have different wavelengths.

According to the invention, a beam combiner 5 is provided, into which the lasers 1, 2, 3, 4 couple in their laser beams. The "optical coupling" of all lasers 1, 2, 3, 4 to a downstream AOTF (Acousto Optical Tunable Filter) 11 takes place exclusively via the lower splitter mirror of the beam combiner 5. From the beam combiner 5, a common beam path leads through the AOTF 11 and an AOM (Acousto Optical Modulator) 13 via an optical fiber 6 to the laser scanning microscope 7 of which only an indication is given in the figure.

The single figure shows particularly clearly that one of the lasers, namely the laser identified by the reference symbol 4, couples directly into the beam combiner 5. The other lasers 1, 2 and 3 couple in each instance into the beam combiner 5 via an optical fiber 8.

The beam combiner 5 is disposed in a housing 9. In corresponding fashion, the laser 4 which couples directly into the beam combiner 5 is directly connected to the housing 9. A corresponding adapter head has not been shown here, for the sake of simplicity.

The further lasers 1, 2 and 3 lead via the optical fibers 8 through the housing wall, or through corresponding connections 10, into the interior of the housing; in this case, coupling into the beam combiner takes place there.

As has already been mentioned hereinabove, according to the single FIG. an AOTF (Acousto Optical Tunable Filter) 11 is connected downstream of the beam combiner 5 within the housing 9; in this case, this AOTF 11 serves for the selection and individual setting of the line power. Downstream of the AOTF 11 there is in turn connected an AOM (Acousto Optical Modulator) 13 which serves for beam modulation and rapid beam deenergization. From there, the optical fiber 6 designed as a single mode fiber leads via a corresponding connection 12 to the laser scanning microscope 7, in order there to couple in the laser beam having a plurality of wavelengths or a plurality of laser lines in the sense of a point light source.

With respect to the process according to the invention, reference is made to the general part of the description in order to avoid repetitions.

Finally, it should be quite particularly pointed out that the illustrative embodiment discussed hereinabove serves merely for the discussion of the teaching claimed here, but does not restrict the latter to the illustrative embodiment.

PARTS LIST

1 Laser
2 Laser
3 Laser
4 Laser
5 Beam combiner
6 Optical fiber (from the beam combiner to the laser scanning microscope)
7 Laser scanning microscope, microscope
8 Optical fiber (from the laser to the beam combiner)
9 Housing
10 Connection (into the housing)
11 AOTF
12 Connection (to the laser scanning microscope)
13 AOM

What is claimed is:

1. A microscope comprising:
    a connector on a microscope for a first optical fiber; and
    a point light source for the microscope, in which at least two lasers of different wavelengths are coupled into the microscope which further comprises
    at least two laser light sources which couple into a beam combiner, wherein at least one of the lasers is coupled via a second optical fiber into the beam combiner, and wherein the first optical fiber optically couples laser light from the beam combiner to the microscope.

2. The microscope as claimed in claim 1, wherein one of the lasers couples directly into the beam combiner and two further lasers couple in each instance via the second and a third optical fiber into the beam combiner.

3. The microscope as claimed in claim 1, wherein one of the lasers couples directly into the beam combiner and three further lasers couple in each instance via the second, a third, and a fourth optical fiber into the beam combiner.

4. The microscope as claimed in claim 1, wherein the beam combiner designed as a dichroic beam combiner.

5. The microscope as claimed in claim 1, wherein the beam combiner is disposed in a housing, and wherein one of the lasers is coupled directly into the beam combiner and is fixed to the housing via an adapter head.

6. The microscope as claimed in claim 5, wherein the housing is made of metal.

7. The microscope as claimed in claim 5, wherein the housing is made of plastic material.

8. The microscope as claimed in claim 5, further comprising:
    an AOTF (Acousto Optical Tunable Filter) for the selection and individual setting of the line power disposed within the housing, downstream of the beam combiner to receive a combined light beam.

9. The microscope as claimed in claim 5, further comprising:
    an AOM (Acousto Optical Modulator) for beam modulation and rapid beam deenergization disposed within the housing, downstream of the beam combiner to receive a combined light beam.

10. The point light source as claimed in claim 1, wherein the second optical fiber leading from the beam combiner to the microscope is a single mode fiber.

11. A process for coupling at least two lasers of different wavelengths into a microscope, the process comprises the steps of:
    combining the at least two lasers in an encased housing; and
    coupling the at least two lasers into the microscope jointly as a singular point light source.

12. The process as claimed in clam 11, wherein, from the encased housing, coupling into the microscope takes place via a single mode optical fiber.

13. The process as claimed in claim 12, Wherein one of the at least two lasers couples directly and at least one further laser couples via an optical fibre into the encased housing.

14. The process as claimed in claim 12, wherein, prior to coupling into the microscope, a selection and individual setting of the line power takes place by an AOTF (Acousto Optical Tunable Filter).

15. The process as claimed in claim 12, wherein, prior to coupling into the microscope, a beam modulation and rapid beam deenergization takes place by an AOM (Acousto Optical Modulator).

16. The microscope as claimed in claim 1, wherein the microscope is a laser scanning microscope.

17. An arrangement for a laser scanning microscope, comprising:
    a port disposed on a microscope to receive a first optical fiber;
    a first laser emitting a first light beam having a first wavelength;
    a second laser emitting a second light beam having a second wavelength, the second wavelength different from the first wavelength;
    a beam combiner to combine the first and second light beams; and
    a second optical fiber to couple the first light beam into the beam combiner, wherein the first optical fiber couples light output from the beam combiner into the port of the microscope.

18. The point light source according to claim 17, further comprising:
    a housing to encase the beam combiner, wherein the beam combiner includes a dichroic mirror, and wherein a path of the second light beam from the second laser to the first optical fiber defines an optical path, wherein the beam combiner combines the first and second light beams along the optical path; and an AOTF (Acousto Optical Tunable Filter) disposed along the optical path between the beam combiner and the second optical fiber.

19. The point light source according to claim 18, further comprising:

an AOM (Acousto Optical Modulator) disposed along the optical path between the AOTF and the second optical fiber.

20. The point light source according to claim 18, further comprising:

a third laser for emitting a third light beam having a third wavelength; and a third optical fiber coupling the third light beam from the third laser into the beam combiner, wherein the beam combiner combines the first, second, and third light beams, and wherein the first, second, and third wavelengths are different from one another.

21. The point light source according to claim 20, further comprising:

a fourth laser for emitting a fourth light beam having a fourth wavelength; and a fourth optical fiber coupling the fourth light beam from the fourth laser into the beam combiner, wherein the beam combiner combines the first, second, third, and fourth light beams, and wherein the first, second, third, and fourth wavelengths are different from one another.

* * * * *